United States Patent
Stalnaker et al.

(10) Patent No.: US 8,196,462 B2
(45) Date of Patent: Jun. 12, 2012

(54) LATERAL POSITION CONTROL FOR TIRE TREAD WEAR TEST MACHINE

(75) Inventors: David O. Stalnaker, Hartville, OH (US); Takayuki Kurata, Tokyo (JP)

(73) Assignees: Bridgestone Americas Tire Operations, LLC, Nashville, TN (US); Bridgestone Corporation, Tokyo (JP)

( * ) Notice: Subject to any disclaimer, the term of this patent is extended or adjusted under 35 U.S.C. 154(b) by 0 days.

(21) Appl. No.: 12/666,440

(22) PCT Filed: Jun. 26, 2008

(86) PCT No.: PCT/US2008/068357
§ 371 (c)(1),
(2), (4) Date: Oct. 1, 2010

(87) PCT Pub. No.: WO2009/003108
PCT Pub. Date: Dec. 31, 2008

(65) Prior Publication Data
US 2011/0011170 A1    Jan. 20, 2011

(51) Int. Cl.
G01M 17/02    (2006.01)
(52) U.S. Cl. ......................................................... 73/146
(58) Field of Classification Search .......... 73/146–146.8
See application file for complete search history.

(56) References Cited

U.S. PATENT DOCUMENTS

| | | | |
|---|---|---|---|
| 3,927,561 A | 12/1975 | Schleimann | |
| 4,577,497 A * | 3/1986 | Ray et al. | 73/126 |
| 4,593,557 A | 6/1986 | Oblizajek et al. | |
| 4,969,355 A | 11/1990 | Doi et al. | |
| 5,111,685 A | 5/1992 | Langer | |
| 5,245,867 A | 9/1993 | Sube et al. | |
| 5,481,907 A | 1/1996 | Chasco et al. | |
| 5,773,717 A | 6/1998 | Reinhardt et al. | |
| 6,050,876 A | 4/2000 | Ouyang et al. | |
| 6,155,110 A | 12/2000 | Lightner et al. | |
| 6,591,669 B1 | 7/2003 | Serra et al. | |
| 6,799,470 B2 | 10/2004 | Harada | |
| 7,055,381 B2 | 6/2006 | Bochkor et al. | |
| 7,140,242 B1 | 11/2006 | Poling, Sr. et al. | |
| 2002/0011102 A1 * | 1/2002 | Leska et al. | 73/146 |
| 2006/0243042 A1 * | 11/2006 | Leska et al. | 73/146 |
| 2009/0301183 A1 * | 12/2009 | Jenniges et al. | 73/146 |
| 2010/0031740 A1 * | 2/2010 | Olex et al. | 73/146 |

* cited by examiner

*Primary Examiner* — Andre Allen
(74) *Attorney, Agent, or Firm* — Matthew W. Jupina

(57) ABSTRACT

A method of tire testing comprising applying a drive torque to a tire and a wheel assembly about an axis of rotation to drive the tire and wheel assembly and a rotatable drum with the tire in rolling contact with the rotatable drum; controlling a load pressure of the tire against the rotatable drum; and adjusting a lateral position of the tire across a surface of the rotatable drum.

10 Claims, 2 Drawing Sheets

LATERAL POSITION CONTROL FOR TIRE TREAD WEAR TEST MACHINE

BACKGROUND

The present invention relates to a tire testing system that positions a rotating tire on a roadway simulator. More particularly, the present invention provides a lateral position control feature for a tire tread wear test machine.

The testing of tires using a roadway simulator such as a drum or flat belt is known. During the testing, the tire is rotated against an outer surface of the roadway simulator that simulates various road pavements such as concrete or blacktop. The tire is typically mounted to a wheel assembly, the wheel assembly being forced toward the roadway simulator in order to apply radial loads upon the tire to simulate the weight of an automobile.

The wheel assembly is mounted to an adjustable carriage for adjusting the axial position of the wheel assembly, and thus, when and with what force the tire contacts the roadway simulator. By varying the angular placement of the tire on the roadway simulator, tread wear, static and dynamic forces and moments, and other parameters required by specific testing practices can be measured. An example of a tire testing system can be seen in FIG. 1, taken from U.S. Pat. No. 5,481,907, the entirety of which is herein incorporated by reference.

FIG. 1 illustrates a tire testing system 10 incorporating an adjustable wheel positioning assembly 12. The adjustable wheel positioning assembly 12 is mounted and slides on rails 13 which in turn are fixed to a stationary frame 14. The adjustable wheel positioning assembly 12 supports a wheel assembly 16 against a road wheel 18. An outer perimeter surface 20 of the road wheel 18 contacts the tread of a tire 22 of the wheel assembly 16. The outer surface 20 simulates various road surfaces such as black top or concrete. Tire radial loads are applied using a suitable servohydraulically controlled hydraulic actuator, attached to the adjustable wheel positioning assembly 12 and the frame 14. The adjustable wheel positioning assembly 12 adjusts the position of the tire 22 on the outer surface 20. In the embodiment illustrated, the adjustable wheel positioning assembly 12 adjusts the slip angle or steer of the tire 22, which is the rotation of the tire 22 about an axis 24 in a direction indicated by double arrow 26, the axis 24 being generally perpendicular to the contact patch of the tire 22 with the road surface 20. In addition, the adjustable wheel positioning assembly 12 adjusts the camber angle of the tire 22 relative to the outer surface 20. As illustrated, the camber angle is pivotal displacement of the tire 22 and axis 24 on the road wheel 18 to and away from the frame 14 in a direction indicated by double arrow 30.

The frame 14 includes suitable cross members 32 such that the frame 14 self-reacts all forces applied to the tire 22 by the system so that a special facility foundation is not required. A drive/braking unit 38 rotates or loads the roadwheel 18 through a drive belt 40 applying power or braking loads selectively to the roadwheel 18. A direct drive or gear box would also be acceptable. A control system 44 having suitable analog and digital controls monitors system performance and provides command instructions to adjust speed of the roadwheel 18, positioning of the tire 22 on the roadwheel 18 by the adjustable positioning of assembly 12, and location of the adjustable wheel positioning assembly 12 on the frame 14. An operator control center 48 connected to the control system 44 through signal lines 50 provides an interface for an operator.

In a preferred embodiment, three additional adjustable tire positioning assemblies 52, 54 and 56 are provided to allow the system 10 to test four tires simultaneously. As illustrated, the adjustable wheel positioning assembly 52 is mounted to the frame 14 with slides, not shown, on a side opposite adjustable wheel positioning assembly 12. The adjustable wheel positioning assembly 52 supports a wheel assembly 60 so that a tire 62 mounted thereto contacts the roadwheel 18. The adjustable tire testing assemblies 54 and 56 are mounted to the frame 14 in a similar manner on opposite sides of a second roadwheel 64. The second roadwheel 64 is rotated or loaded by a drive/braking unit 66 similar to drive/braking unit 38. Flexible conduits 68, 70, 72 and 74 enclose data signal and control lines, not shown, allowing each of the adjustable tire testing assemblies 12, 52, 54 and 56, respectively, to move relative to the frame 14.

The present invention provides an advantage over the design shown in FIG. 1 by providing for lateral movement of the test tire over the surface of the road wheel. Moreover, one shortcoming of the illustrated design is the repeated use of the same circumferential surface area on the road wheel.

BRIEF DESCRIPTION

The present invention is broadly directed to a tire wear test method including lateral motion control. More particularly, the invention is directed to a method of tire testing by applying a drive torque to a tire and a wheel assembly about an axis of rotation to drive the tire and wheel assembly against a rotatable drum while the tire is in rolling contact with the rotatable drum. The load pressure of the tire against the rotatable drum is controlled and the lateral position of the tire on the surface of the rotatable drum is varied. Preferably, the lateral position of the tire is varied in accord with a user-defined waveform. Advantageously, the surface of the drum can be formed by at least two different abrasive materials.

DETAILED DESCRIPTION

A tire testing machine provides a simulated roadway surface coupled through suitable framework to a mounting for a rotating wheel and tire. The tire is capable of being moved under known loads into engagement with the simulated roadway, steered, and tilted in camber under positive control. The tire supporting framework is mounted relative to the roadway so that the camber loading axis and the steering axis define a plane and the steering axis remains in this plane while it is being loaded under camber.

The present invention is directed to controlling the lateral position of a test tire with respect to the contact location with a test machine's road wheel. Prior art test machine carriages already perform many functions such as measuring and controlling the tire load (Fz), the slip angle (SA) of the tire and road wheel, the side force (Fy), braking or driving torque (My), and inclination angle (IA). In accord with the present invention the tire carriage is constructed to provide lateral tire motion relative to the road testing surface. More particularly, depending upon the width of the tire being tested and the width of the roadway surface, the lateral motion can be controlled such that the roadway surface is evenly used throughout the testing procedure. By controlling the position of the tire, the tire wear can be more uniformly and consistently generated since "tracks" or "grooves" are less likely to form on the abrasive surface.

Figure 2:
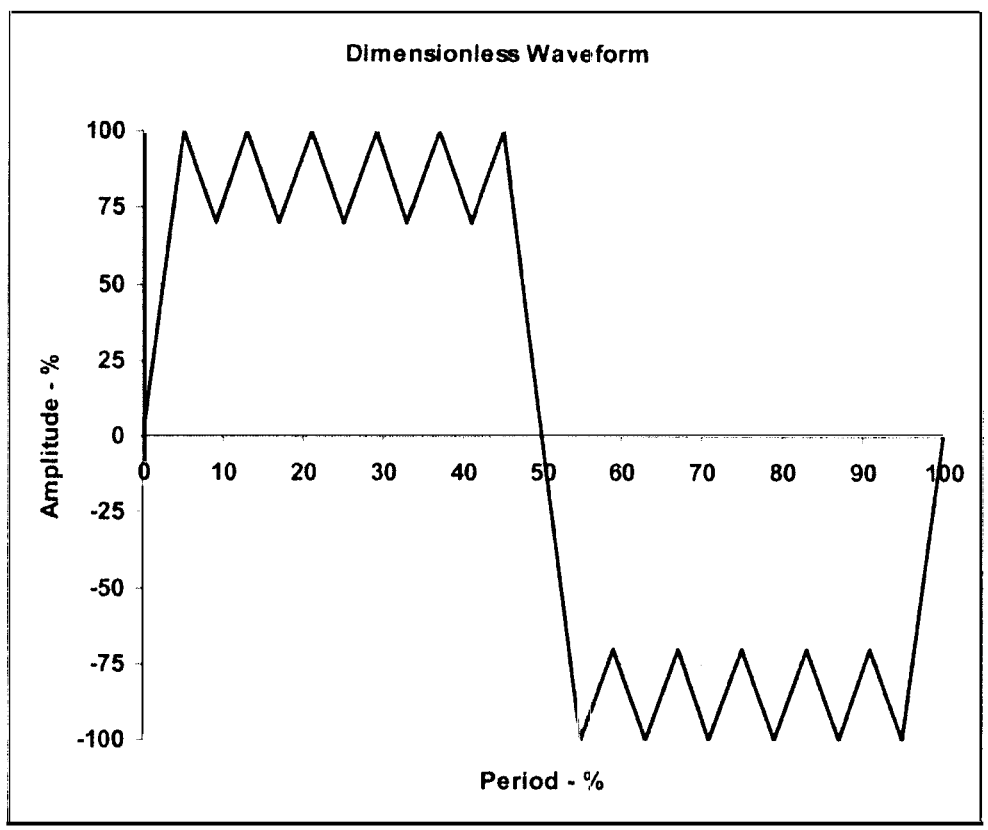
FIG. 2 is a graphical illustration of a typical wave form.

The present invention can further optimize use of the roadway surface by utilizing waveforms. This operating condition is advantageous because a linear ramp rate of the tire back and forth across the abrasive surface of the road wheel, does not necessarily optimize the usage of the surface. For example, the center portion of the roadway surface would experience the predominate wear. Accordingly, the lateral position control system has a digital control system which allows arbitrary waveforms to be defined with up to 1000 points and the amplitude and offset values to be independently controlled and saved. The graph of FIG. 2 illustrates a typical waveform that might be used for a tire with a fairly wide footprint width. The amplitude is lateral location of the center line of the tire contact region with respect to the road wheel. Therefore, 0% would be the center and +/−100% would be the extreme edges of the lateral motion. The period is the time required to complete one cycle, typically 5-10 minutes. In this case, the tire moves to the outer edge of the road wheel 10 times to prevent "tracks", and then at the middle point of the period, it traverses to the inner edge of the road wheel and repeats the same process. Accordingly, a waveform having between 10 and 1000 waveform points can be employed. The cycle is continuously repeated until the wear test is completed. Variables such as the width of the tire footprint, the width of the abrasive surface, the total capability of the lateral motion, and even the width of the tire ribs all need to be considered to optimize the even usage or wear of the surface.

By optimizing the shape of the waveform for the specific tread width of the test tire, excessive shoulder wear caused by testing a wide tire immediately after testing of narrower tires may be eliminated. Similarly, by properly controlling the lateral position of the tire to produce even usage of the entire roadway surface, the surface will need to be changed less often.

The lateral position control aspect of the present invention also makes it possible to use two different abrasive surfaces on the same drum, such as a high micro content surface and a high macro surface, and spend a given percentage of the test time on each of the two surfaces.

Figure 1:
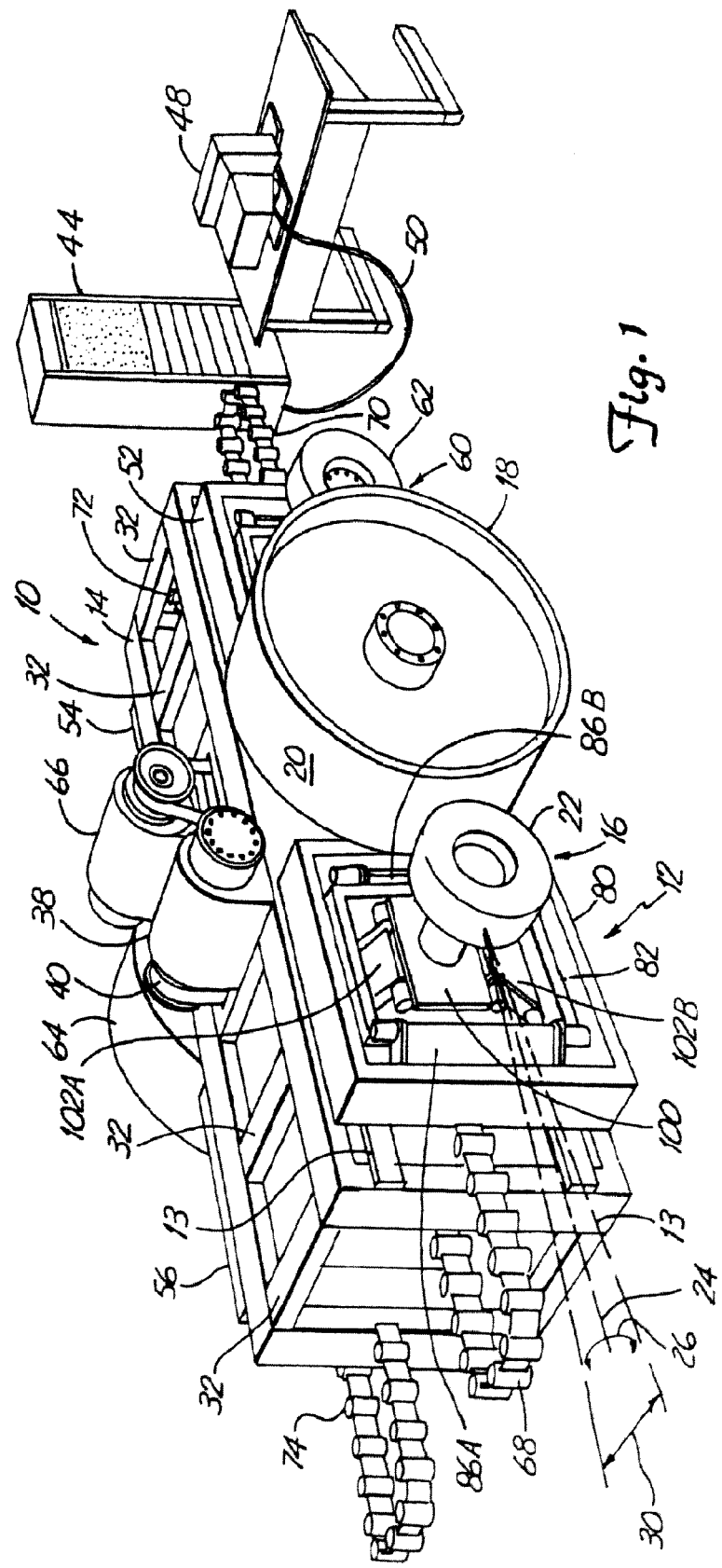
FIG. 1 is a perspective view of a prior art tire testing apparatus.

The tire wear testing machine of the present invention is similar in many ways to the apparatus of FIG. 1, is shown. However, the present machine includes an adjustable wheel positioning assembly that slides to bring a tire (not shown) into contact with a road wheel and includes means which permit controlled side-to-side movement of the wheel assembly relative to the wear surface.

The present invention provides for several distinct advantages over the prior art. Unlike the prior art, the present invention controls the position of the tire and since it can also optimize the shape of the waveform used for the position control, the tire wear can be more uniformly and consistently generated since no "tracks" or "grooves" will be able to form on the abrasive surface. Moreover, by optimizing the shape of the waveform for the specific tread width of the test tire and the width of the roadway surface, the problem of excessive shoulder wear caused by testing a wide tire immediately after the testing of narrower tires will be eliminated. Also, by properly controlling the lateral position of the tire, the present invention produces even usage of the roadway surface. Due to even usage, the surface will not need to be changed as often, which will save both time and cost. Unlike the prior art, the lateral position control makes it possible to use two different abrasive surfaces on the same drum, such as a high micro content surface and a high macro surface, and spend a given percentage of the test time on each of the two surfaces. In addition, the lateral motion makes it possible to reproduce the actual behavior of tire motion associated with vehicle slipping laterally on the road.

An exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method of tire testing comprising:
   applying a drive torque to a tire and a wheel assembly about an axis of rotation to drive the tire and wheel assembly and a rotatable drum with the tire in rolling contact with the rotatable drum;
   controlling a load pressure of the tire against the rotatable drum; and
   adjusting a lateral position of the tire across a surface of the rotatable drum, such that the surface of the rotatable drum is substantially evenly used after conclusion of a test.

2. The method of claim 1, wherein tire testing includes the use of a programmable lateral position waveform.

3. The method of claim 1, wherein a non-linear ramp rate of the tire back and forth across the abrasive surface of the rotatable drum is performed.

4. The method of claim 1, wherein said rotatable drum includes a surface comprised of at least two different abrasive materials.

5. The method of claim 2, wherein said waveform has between 10 and 1000 points.

6. The method of claim 2, wherein said waveform varies in accord with the tread width of the tire.

7. The method of claim 4 wherein said two different abrasive materials comprise a high microcontent surface and a high macrocontent surface.

8. The method of claim 1, wherein tracks are not created in the surface of a rotatable drum.

9. A method of tire testing comprising:
   applying a drive torque to a tire and a wheel assembly about an axis of rotation to drive the tire and wheel assembly and a rotatable drum with the tire in rolling contact with the rotatable drum;
   controlling a load pressure of the tire against the rotatable drum; and
   adjusting a lateral position of the tire across a surface of the rotatable drum according to a programmable lateral position waveform which optimizes wear of the surface of the rotatable drum based on width of the surface and width of a tire footprint.

10. A method of tire testing comprising:
    applying a drive torque to a tire and a wheel assembly about an axis of rotation to drive the tire and wheel assembly and a rotatable drum having a surface comprised of at least two different abrasion materials with the tire in rolling contact with the rotatable drum;
    controlling a load pressure of the tire against the rotatable drum; and
    adjusting a lateral position of the tire across a surface of the rotatable drum.

* * * * *